US005549223A

United States Patent [19]

Hori

[11] Patent Number: 5,549,223

[45] Date of Patent: Aug. 27, 1996

[54] PUMP WITH BACK SUCTION PHASE

[75] Inventor: Nobuaki Hori, Yokohama, Japan

[73] Assignee: Toyo Seikan Kaisha, Ltd., Tokyo, Japan

[21] Appl. No.: 285,386

[22] Filed: Aug. 3, 1994

[51] Int. Cl.[6] .............................. B67D 5/42; G01F 11/04

[52] U.S. Cl. .............................. 222/153.13; 222/321.9; 222/321.3; 222/380; 222/384

[58] Field of Search .............................. 222/153.13, 153.05, 222/153.06, 321.1, 321.3, 321.7, 321.9, 375, 380, 384, 385

[56] References Cited

U.S. PATENT DOCUMENTS

| | | | |
|---|---|---|---|
| 3,128,018 | 4/1964 | Corsette et al. | 222/375 X |
| 3,361,078 | 1/1968 | Cooprider . | |
| 4,154,374 | 5/1979 | Kirk, Jr. . | |
| 4,286,736 | 9/1981 | Corsette | 222/321.9 X |
| 4,524,888 | 6/1985 | Tada | 222/153.3 X |
| 4,538,748 | 9/1985 | Ford et al. | 222/153.13 |

FOREIGN PATENT DOCUMENTS

| | | |
|---|---|---|
| 0378286 | 7/1990 | European Pat. Off. . |
| 0487412 | 5/1992 | European Pat. Off. . |
| 0498275 | 8/1992 | European Pat. Off. . |
| 2532010 | 2/1984 | France . |
| 2699390 | 6/1994 | France . |
| 6074147 | 3/1994 | Japan . |
| 415486 | 6/1964 | Switzerland . |
| 2119868 | 5/1983 | United Kingdom . |

*Primary Examiner*—Kevin P. Shaver
*Attorney, Agent, or Firm*—Christopher R. Pastel; Thomas R. Morrison

[57] ABSTRACT

The present invention provides a pump for pumping fluids, especially highly viscous fluids such as shampoo, from a main fluid container through a nozzle without unwanted dripping, plugging, or mess. A piston reciprocates in a pump chamber, creating positive and negative pressure alternately in the pump chamber. Positive pressure in the pump chamber initiates a discharge phase of operation, wherein the fluid in the pump chamber is forced from the pump chamber through a discharge valve. Negative pressure in the pump chamber causes both a back-suction phase and a suction phase of operation. Back-suction occurs in the pump chamber immediately following the discharge phase, drawing any fluid remaining in an exit passage back through the discharge valve into the pump chamber. The suction phase starts immediately after the discharge valve closes at the end of the back-suction phase. During the suction phase, the negative pressure in the pump chamber draws fluid from the main fluid container through the suction valve and into the pump chamber. A resilient spring member biases the suction valve into a closed position during periods of non-use, especially when the pressure in the main fluid container increases due to an increase in temperature. The strength of the resilient spring member is established at a value which maintains the suction valve closed until a predetermined negative pressure is established across it.

9 Claims, 8 Drawing Sheets

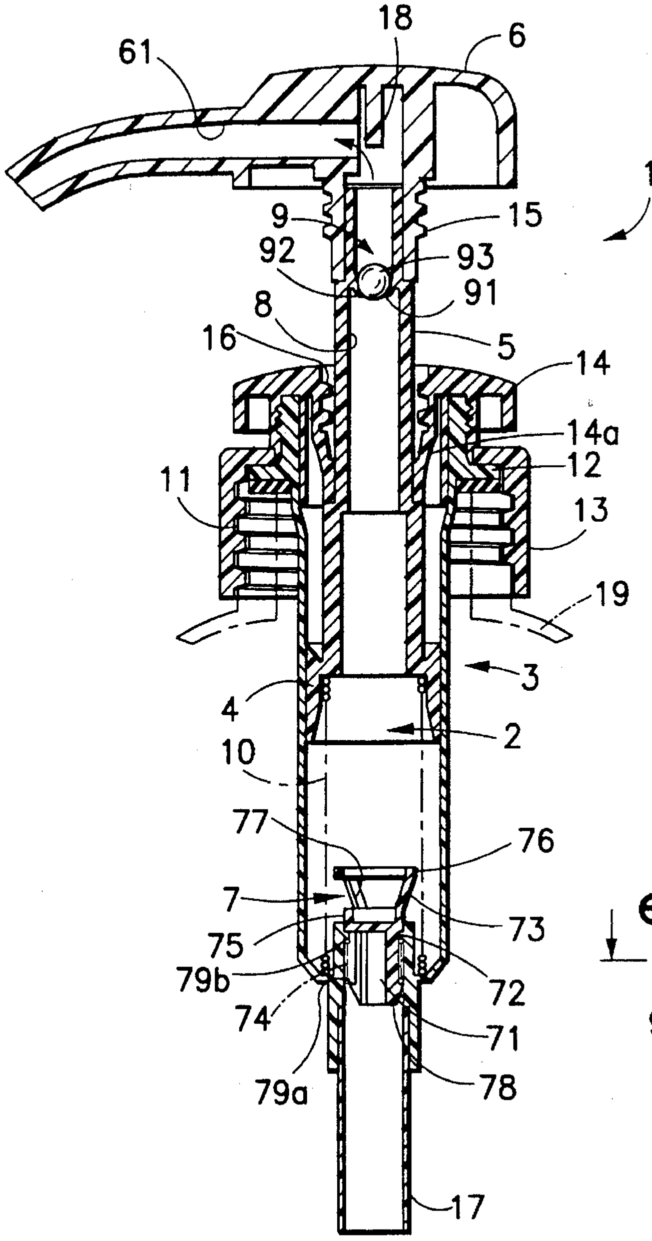
FIG. 1(a)
FIG. 1(b)
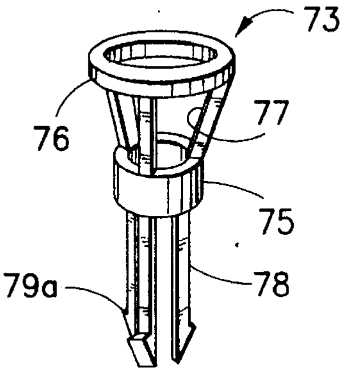
FIG. 1(c)
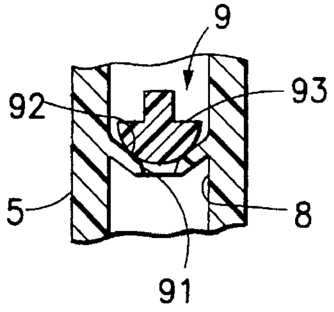
FIG. 1(d)
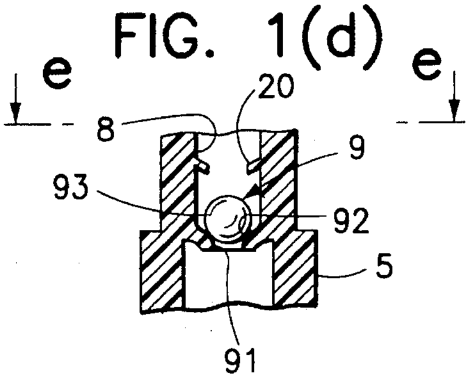
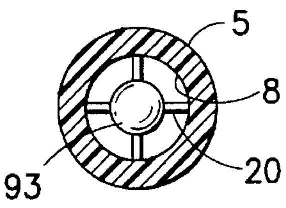
FIG. 1(e)

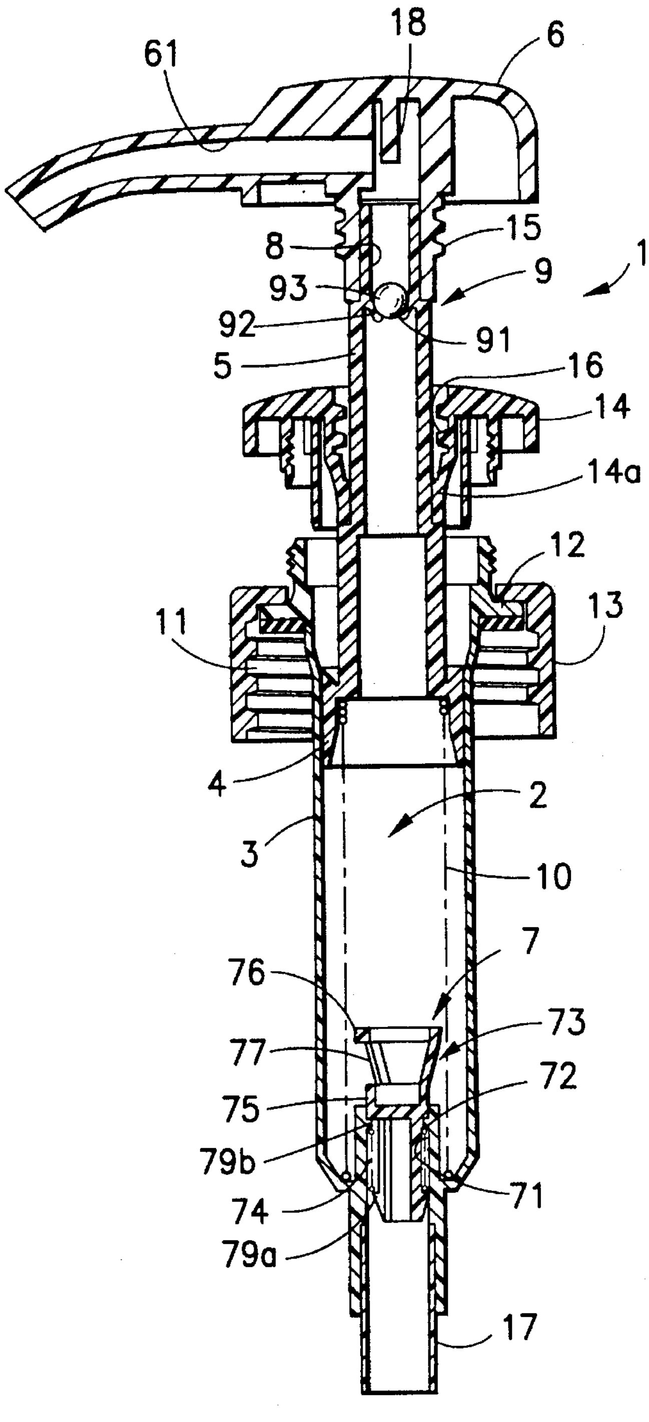
FIG. 4(a)
FIG. 4(b)
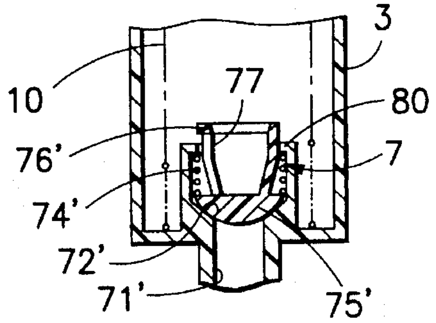
FIG. 4(c)
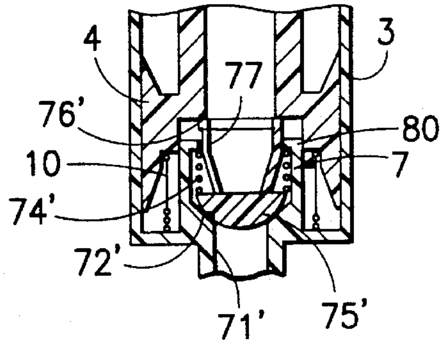

PUMP WITH BACK SUCTION PHASE

BACKGROUND OF THE INVENTION

The present invention relates to a pump which can repeatedly dispense a predetermined volume of liquid. More particularly, the present invention relates to a pump for more efficiently pumping highly viscous materials, such as shampoo or soap, without dripping or plugging. Such a pump is also capable of use at high temperatures without dripping.

British Patent No. 2119868A discloses a pump in which a piston reciprocates within a pump chamber to transport fluid out of a main fluid container. A suction valve located within the pump chamber allows fluid to flow from the main fluid container into the pump chamber. A discharge valve located on the interior of the piston permits fluid to flow from the pump chamber to a nozzle. A spring member is interposed between the piston and the bottom of the pump chamber to bias the piston into an upward position.

A positive pressure differential develops within the pump chamber as the piston is forced downward within the pump chamber. The positive pressure differential forces fluid in the pump chamber through the discharge valve and ultimately out the nozzle. The spring member forces the piston upward immediately following the discharge of fluid from the pump chamber. The upward travel of the piston causes a negative pressure differential to develop within the pump chamber. The negative pressure differential draws fluid from the main fluid container, through the suction valve, into the pump chamber.

However, a problem exists with the aforementioned pump in that fluid tends to accumulate within the nozzle during fluid discharge. The accumulation of fluid within the nozzle can lead to clogging and plugging so that fluid discharge is restricted or completely blocked. In addition, the discharge valve has difficulty closing fully when highly viscous fluids are pumped, which causes inefficient pump operation.

A problem also exists with the pump when high temperatures are present during storage. As temperatures rise, the pressure within the main fluid container increases. The increase in pressure within the main fluid container forces fluid through the suction valve and into the pump chamber. The unwanted influx of fluid from the main fluid container can force travel through the discharge valve and out the nozzle, causing fluid to drip and/or accumulate.

The present invention aims at solving the aforementioned drawbacks associated with prior art pumps.

OBJECTS AND SUMMARY OF THE INVENTION

Accordingly, it is an object of the present invention to provide a pump which overcomes the drawbacks of the prior art.

It is a still further object of the present invention to provide a pump which prevents inadvertent dripping of fluid during use.

It is a still further object of the present invention to provide a pump which exhibits a high efficiency in pumping highly viscous liquid.

It is a still further object of the present invention to provide a pump which can remain idle at high temperatures without dripping.

Briefly stated, the present invention provides a pump for pumping fluids, especially highly viscous fluids such as shampoo, from a main fluid container through a nozzle without unwanted dripping, plugging, or mess. A piston reciprocates in a pump chamber, creating positive and negative pressure alternately in the pump chamber. Positive pressure in the pump chamber initiates a discharge phase of operation, wherein the fluid in the pump chamber is forced from the pump chamber through a discharge valve. Negative pressure in the pump chamber causes both a back-suction phase and a suction phase of operation. Back-suction occurs in the pump chamber immediately following the discharge phase, drawing any fluid remaining in an exit passage back through the discharge valve into the pump chamber. The suction phase starts immediately after the discharge valve closes at the end of the back-suction phase. During the suction phase, the negative pressure in the pump chamber draws fluid from the main fluid container through the suction valve and into the pump chamber. A resilient spring member biases the suction valve into a closed position during periods of non-use, especially when the pressure in the main fluid container increases due to an increase in temperature. The strength of the resilient spring member is established at a value which maintains the suction valve closed until a predetermined negative pressure is established across it.

According to an embodiment of the invention, there is provided a pump, comprising: a pump chamber having an upper end and a lower end, means for altering the pressure in the pump chamber, a first check valve having means for permitting a return flow of fluid before closing fully, a second check valve having means for remaining closed until a specified threshold negative pressure exists in the pump chamber, and the first check valve being connected to the second check valve by the pump chamber.

According to a feature of the invention, there is provided a pump comprising: a pump chamber having a lower end and an upper end, a nozzle having an exit passage, a connecting chamber connecting the pump chamber to the exit passage of the nozzle, a piston slidably disposed within the pump chamber having a lower end facing the pump chamber and an upper end fixedly attached to the nozzle, a first spring member compressibly interposed between the lower end of the piston and the lower end of the pump chamber biasing the piston so as to cause the volume within the pump chamber to be at a maximum, the piston reducing the volume of the pump chamber in response to an external pressure applied to the nozzle, creating a positive pressure within the pump chamber, the piston expanding the volume within the pump chamber in response to removal of the external pressure applied to the nozzle, creating a negative pressure within the pump chamber, and the negative pressure having a suction portion and a back-suction portion.

According to a further feature of the invention, there is provided a pump comprising: a pump chamber, means for selectively creating a negative pressure and a positive pressure in the pump chamber, a suction valve for admitting a fluid to the pump chamber in a presence of the negative pressure, a discharge valve for releasing the fluid from the pump chamber in a presence of the positive pressure, and means for maintaining the suction valve in a closed condition until a predetermined value of the negative pressure exists in the pump chamber.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 1(*a*) is a vertical cross-section view of a pump made in accordance with the present invention.

FIG. 1(*b*) is an enlarged perspective view of a suction valve body of one embodiment of the present invention.

FIG. 1(*c*) is a vertical cross-section view depicting a discharge valve of one embodiment of the present invention.

FIG. 1(*d*) is a vertical cross-section view of a discharge valve in another embodiment of the present invention.

FIG. 1(*e*) is a horizontal cross-section view of a discharge valve of the embodiment shown in FIG. 1(*d*), viewed from plane E—E.

FIG. 2(*a*) and FIG. 2(*f*) depict a pump of the present invention in the starting position.

FIG. 2(*b*) illustrates a pump of the present invention in the discharge phase of operation.

FIG. 2(*c*) depicts a pump of the present invention at the completion of the discharge phase.

FIG. 2(*d*) shows a pump of the present invention during the back-suction phase.

FIG. 2(*e*) illustrates a pump of the present invention in the suction phase.

FIG. 4(*a*) is a vertical cross-section view of a pump of the present invention.

FIG. 4(*b*) is an enlarged vertical cross-section view of a suction valve of one embodiment of the present invention.

FIG. 4(*c*) is an enlarged vertical cross-section view of a suction valve of the embodiment shown in FIG. 4(*b*).

FIG. 5(*b*) is a perspective view of a piston and suction valve body of a pump in one embodiment of the present invention.

FIG. 5(*c*) is a horizontal cross-section view of a connecting chamber in one embodiment of the present invention.

DETAILED DESCRIPTION OF THE PREFERRED EMBODIMENT

Figure 7:
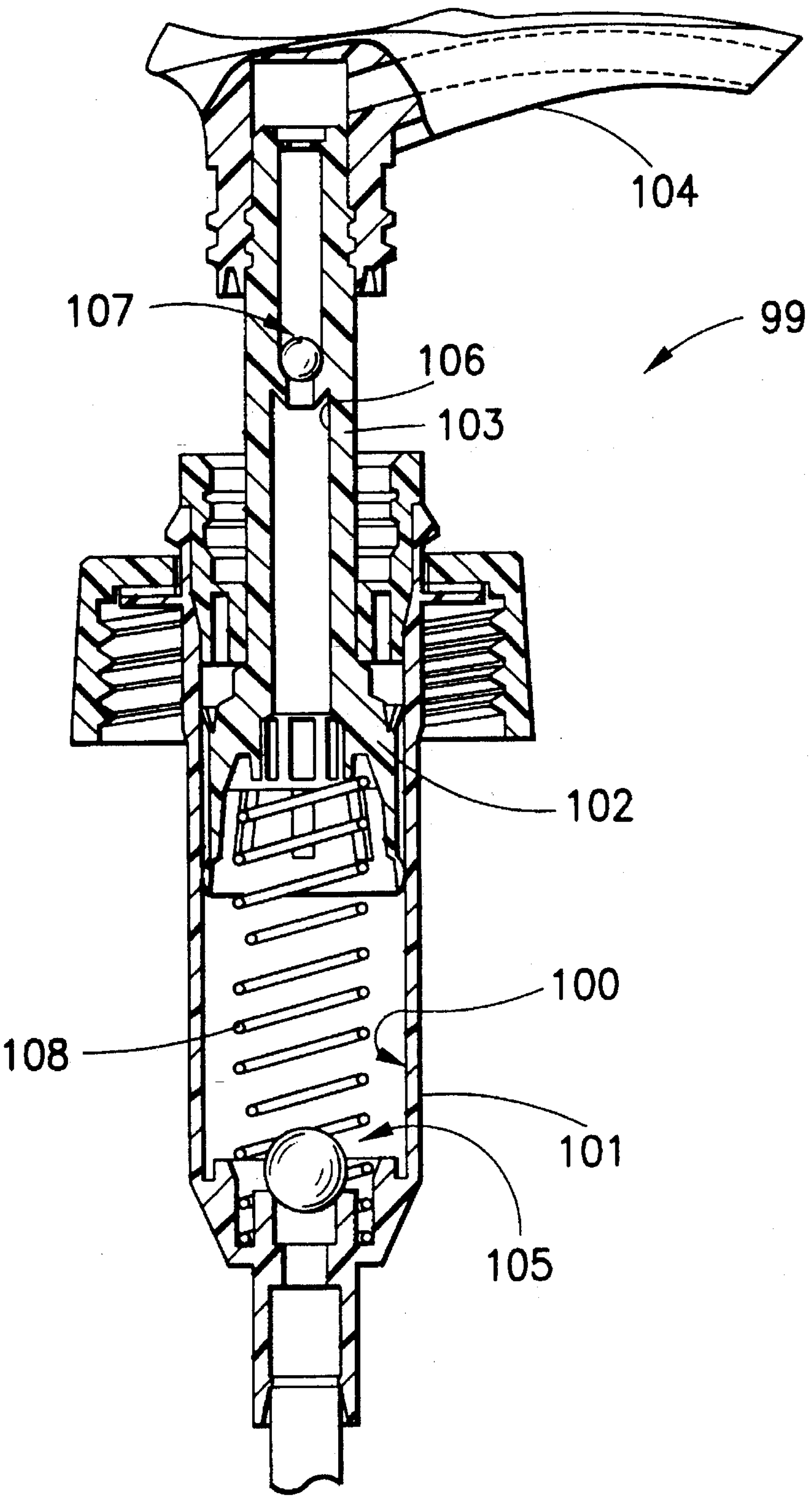
FIG. 7 PRIOR ART
FIG. 7 is a vertical cross-section view of a prior art pump.

Referring to FIG. 7, a pump 99 according to the prior art includes a pump chamber 100 inside a pump body 101. Pump chamber 100 serves as a fluid reservoir. A piston 102, disposed within pump body 101, is connected by a stem 103 to a nozzle 104. A connecting chamber 106 passes from pump body 101, through stem 103 to nozzle 104. A spring member 108 in pump body 101 biases piston 102 in an upward direction. A suction valve 105, in the bottom of pump body 101, permits only an inflow therepast of a fluid, and prevents outward flow thereof. A discharge valve 107, in connecting chamber 106, permits only outward flow of fluid therepast.

Nozzle 104 is pressed downward against the resistance of spring member 108. During the downward travel of nozzle 104, suction valve retains fluid in pump chamber 100, and a positive pressure develops within pump chamber 100. The positive pressure forces discharge valve 107 open to permit fluid to move therepast toward nozzle 104. Fluid is thereby discharged through nozzle 104.

When the downward pressure on nozzle 104 is released, nozzle 104 is moved upward by the urging of spring member 108. During the upward movement of nozzle 104, discharge valve 107 is closed, thereby producing a negative pressure in pump chamber 100. As a result of the reduced pressure, fluid is drawn past suction valve 105, thereby filling pump chamber 100, in preparation for the next cycle.

The positive pressure within pump chamber 100 causes a discharge phase, wherein fluid in pump chamber 100 is forced from pump chamber 100 through connecting chamber 106 and discharge valve 107 to exit from nozzle 104. A negative pressure within pump chamber 100 causes a suction phase, wherein fluid in a main fluid container (not shown) is drawn through suction valve 105 into pump chamber 100.

However, in the conventional pump noted above, fluid has the tendency to remain in nozzle 104 after the discharge phase, which leads to dripping, unwanted mess, and unnecessary waste of fluid. In addition, fluid remaining within nozzle 104 can solidify, which can ultimately cause nozzle 104 to plug completely or partly such that fluid sprays sporadically as it exits nozzle 104.

Another drawback of conventional pumps is that an increase in temperature during non-use causes the internal pressure in the main fluid container (not shown) to increase. The increase in pressure in the main fluid container (not shown) forces fluid through suction valve 105 into pump chamber 100. This unwanted inflow of fluid into pump chamber 100 can ultimately force fluid through discharge valve 107 and out nozzle 104.

Referring to FIG. 1(*a*), a pump 1, according to an embodiment of the invention, includes an accumulator 3 having a piston 4 disposed therein. A pump chamber 2 serves as a fluid reservoir. Piston 4 can be reciprocated within accumulator 3 to increase and decrease the pressure in pump chamber 2. Piston 4 has a generally reverse conical-shaped end facing pump chamber 2 and a hollow stem 5 attached to a nozzle 6. Piston 4 is biased into a starting position by a first spring member 10. The volume of pump chamber 2 is at a maximum when piston 4 is at the starting position.

First spring member 10 is a coil spring disposed within pump chamber 2. First spring member 10 is compressed between piston 4 and the lower end of pump chamber 2. The diameter of first spring member 10 is larger than the diameter of suction valve body 73 such that first spring member 10 expands and contracts during pump operation without interfering with suction valve body 73.

A discharge valve 9 is disposed within a connecting chamber 8 between piston 4 and nozzle 6. Discharge valve 9 has a discharge valve body 93, preferably a ball as shown, which cooperates with a discharge valve seat 92 to block or open a discharge opening 91. A discharge valve stopper 18 is located on nozzle 6 to block discharge valve body 93 from traveling into an exit passage 61 of nozzle 6.

A suction valve 7 is located at the bottom of pump chamber 2. Suction valve 7 has a suction valve body 73 which cooperates with a suction valve seat 72 to block or open a suction valve opening 71. Suction valve body 73 has a suction valve head 75 which is the actual point of contact between suction valve body 73 and suction valve seat 72. A suction valve stopper 76 extends upward in a conical fashion from suction valve head 75. A plurality of stopper notches 77 are cut out of suction valve stopper 76 between suction valve head 75 and suction valve stopper 76. Guide pieces 78 extend downward from suction valve head 75 toward extension tube 17. Guide piece 78 has a lower second spring seat 79*a* at the distal end thereof.

A second spring member 74 is interposed between lower second spring seat 79*a* and an upper second spring seat 79*b*.

Upper second spring seat **79*b* is located on the inner perimeter of suction valve opening 71, just below suction valve seat 72**.

Accumulator 3 is disposed within an opening rim 11 of a main fluid container 19. A flange 12 on the upper end of accumulator 3 engages opening rim 11. Flange 12 is secured within opening rim 11 by container cap 13. Container cap 13 is screwed onto the outer perimeter of opening rim 11, thereby compressing flange 12 between container cap 13 and opening rim 11. An extension tube 17 is connected to accumulator 3 to extend into main fluid container 19.

An upper cap 14 is secured to an outer perimeter of accumulator 3 directly superior to flange 12. A female locking thread 16 is arranged within the inner perimeter of upper cap 14. Female locking thread 16 cooperates with a male locking thread 15. Male locking thread 15 is integrally related to nozzle 6. Male locking thread 15 screws into female locking thread 16 to secure piston 4 in a compressed position against suction vane stopper 76. Upper cap 14 has a guide ring **14*a* extending downward from female locking thread 16 toward pump chamber 2. Guide ring 14*a* guides stem 5 within accumulator 3**.

A discharge phase is initiated when piston 4 is forced downward into pump chamber 2. The volume within pump chamber 2 decreases as piston descends into pump chamber 2, thereby causing a positive pressure differential to develop within pump chamber 2. Positive pressure in pump chamber 2 forces fluid therein to flow out exit passage 61 of nozzle 6 after passing through connecting chamber 8 and discharge valve 9.

As the pressure increases within pump chamber 2, discharge valve body 93 is separated from discharge valve seat 92 and moved toward nozzle 6. Discharge valve stopper 18 stops discharge valve body 93 from traveling into exit passage 61 of nozzle 6. A full discharge phase is complete when male locking thread 15 of nozzle 6 is forced into contact with female locking thread 16 of upper cap 14. However, the discharge phase may be terminated prior to a full descent of piston 4 within pump chamber 2 by allowing piston 4 to return to its starting position prior via the bias of first spring member 10.

A back-suction phase occurs immediately following the aforementioned discharge phase. During the back-suction phase, a negative pressure within pump chamber 2 draws any fluid remaining in exit passage 61 after the discharge phase back through discharge valve 9 into pump chamber 2.

Negative pressure is created within pump chamber 2 as piston 4 ascends in pump chamber 2 toward the starting position. The volume of pump chamber 2 increases as piston 4 ascends, creating a partial vacuum within pump chamber 2. The back-suction phase is complete when discharge valve body 93, which traveled away from discharge valve seat 92 during the discharge phase, is drawn back toward discharge valve seat 92 to close discharge valve 9. Suction valve 7 is biased closed during the back-suction phase via second spring member 74.

A suction phase immediately follows the back-suction phase. Piston 4 continues ascending in pump chamber 2 when discharge valve 9 closes to complete the back-suction phase. The negative pressure developing within pump chamber 2 draws fluid from main fluid container 19 through suction valve 7 into pump chamber 2. The suction phase is complete when piston 4 returns to the starting position, with first spring member 10 fully extended and the volume of pump chamber 2 at a maximum.

Referring to FIG. 1(*b*), suction valve body 73 of suction valve 7 is formed from a resin member. Suction valve body 73 cooperates with suction valve seat 72 to open and close suction valve 7. Suction valve stopper 76 contacts piston 4 during the locked position to force suction valve head 75 onto suction valve seat 72 to close suction valve 7.

Guide pieces 78 consist of a plurality of parallel projections contiguously formed on suction valve head 75. Guide pieces 78 extend vertically downward from suction valve head 75 within suction valve opening 71 toward extension tube 17. While FIG. 1(*b*) illustrates an embodiment with three guide pieces 78, additional projections could be utilized to effectuate the same result. Similarly, a single cylindrically-shaped guide piece 78 could be used to guide suction valve body 73 in suction valve seat 72.

A plurality of stopper notches 77 are cut out of suction valve stopper 76 to give suction valve stopper 76 resiliency. Suction valve stopper 76 has a conical shape with its diameter increasing as suction valve stopper 76 extends away from suction valve head 75. Suction valve stopper 76 is resilient not only along the axial direction, but also along the direction of torsion. Although shown in the FIG. 1(*b*) having three stopper notches 77, it would also be possible to employ as few as one stopper notch 77 or multiple stopper notches 77 to effectuate the same result.

Second spring member 74 is compressed between an upper second spring seat **79*b* and lower second spring seat 79*a*. Upper second spring seat 79*b* is located on the underside of suction valve seat 72 within suction valve opening 71. Lower second spring seat 79*a* is located at the distal end of guide pieces 78**.

Second spring member 74, in its normally biased state, forces guide pieces 78 downward in suction opening 71 toward extension tube 17. This forces suction valve head 75 into contact with suction valve seat 72, closing suction valve 7. Second spring member 74 cooperates with suction valve body 73 to prevent fluid flow through suction valve 7 during the back-suction phase. Second spring member 74 also prevents fluid flow through suction valve 7 when the pressure rises within fluid container 19 due to an increase in temperature.

Referring now to FIG. 1(*c*), discharge valve 9 has a discharge valve body 93 which cooperates with discharge valve seat 92 to close and open discharge opening 91. Discharge valve 9 is located within connecting chamber 8 of stem 5. Discharge valve 9 is a one-way valve that closes when negative pressure exists within pump chamber 2 and opens when positive pressure exists within pump chamber 2.

Discharge valve body 93 of the present embodiment is constructed from a resin member with a notch on one side of the body. The notched shape minimizes the weight of discharge valve body 93, providing greater sensitivity to pressure changes within pump 1 during operation. Discharge valve body 93 may also be a spherical check-ball made of either plastic or metal. The composition of discharge valve body 93 may be chosen based on specific gravity required to control the rate at which discharge valve body 93 travels from and returns to discharge valve seat 92 during operation.

Discharge valve body 93 cooperates with discharge valve seat 92 to regulate fluid flow from connecting chamber 8 into exit passage 61 of nozzle 6. Discharge stopper 18 prevents discharge valve body 93 from traveling into, and blocking, exit passage 61 of nozzle 6. In the starting position, discharge valve body 93 rests against discharge valve seat 92 due to its own weight, thereby closing discharge opening 91.

FIGS. 1(*d*) and 1(*e*) illustrate another embodiment of discharge valve 9. In this embodiment, discharge body 93 is a ball. A plurality of projections 20 are disposed radially within connecting chamber 8 at a predetermined distance from discharge valve 9 to limit the travel of discharge valve body 93 during the discharge phase. Projections 20 are spaced apart within connecting chamber 8 to allow fluid to flow therepast during the discharge phase.

The length of time of the back-suction phase is regulated by the distance between projections 20 and discharge valve seat 92. The length of time for back-suction may also be regulated by the specific gravity and/or the size of discharge valve body 93 to control the rate at which discharge valve body 93 travels from and returns to discharge valve seat 92. It is desirable for discharge valve body 93 to have a small diameter to minimize the probability of discharge valve body 93 becoming lodged within discharge valve 9 due to accumulation of highly viscous fluid within discharge valve 9.

Figures 2A, 2B, 2C:
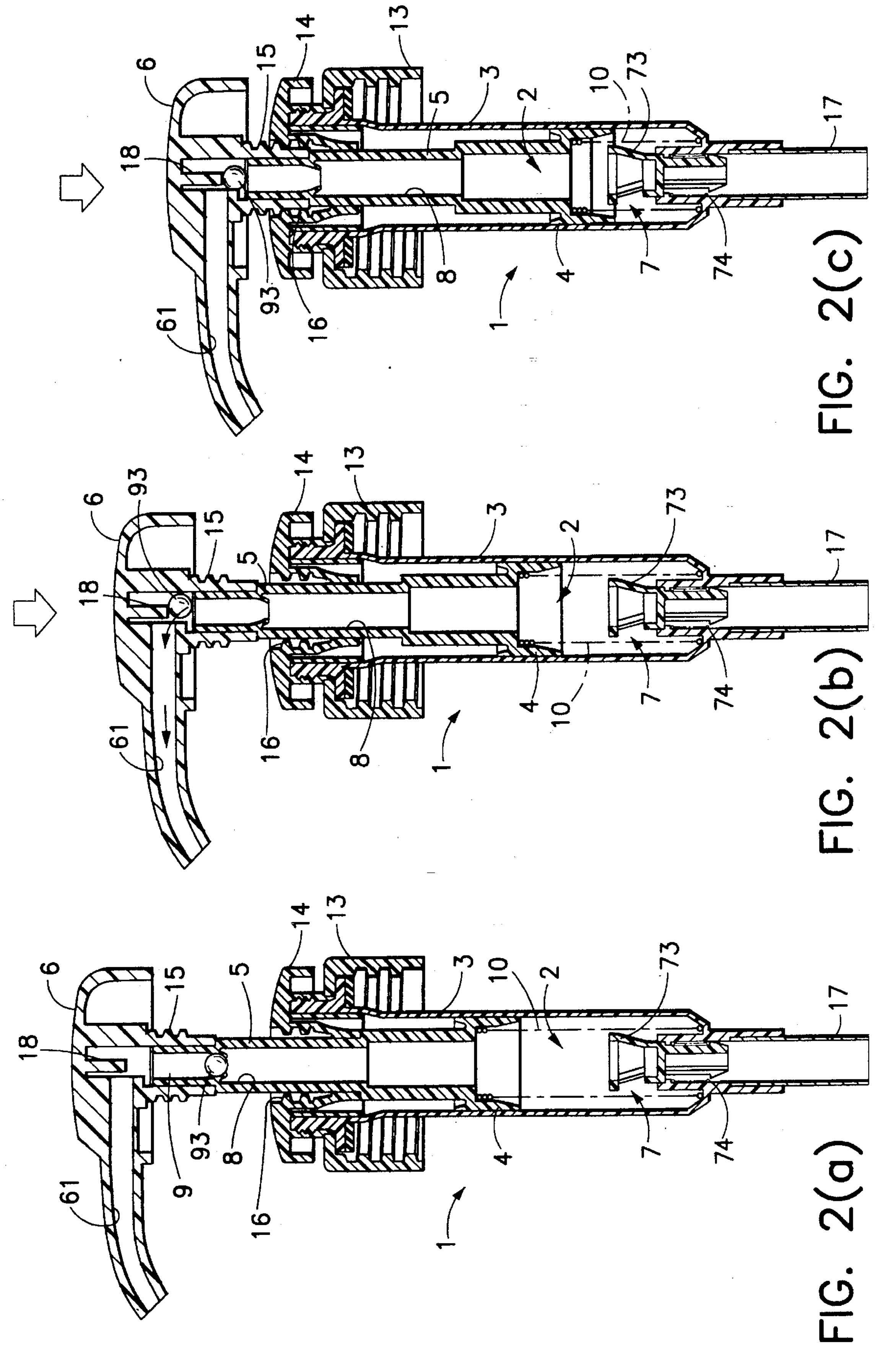
FIGS. 2(*a*)–2(*f*) depict a pump of the present invention progressing through a full operational cycle.
Figures 2D, 2E, 2F:
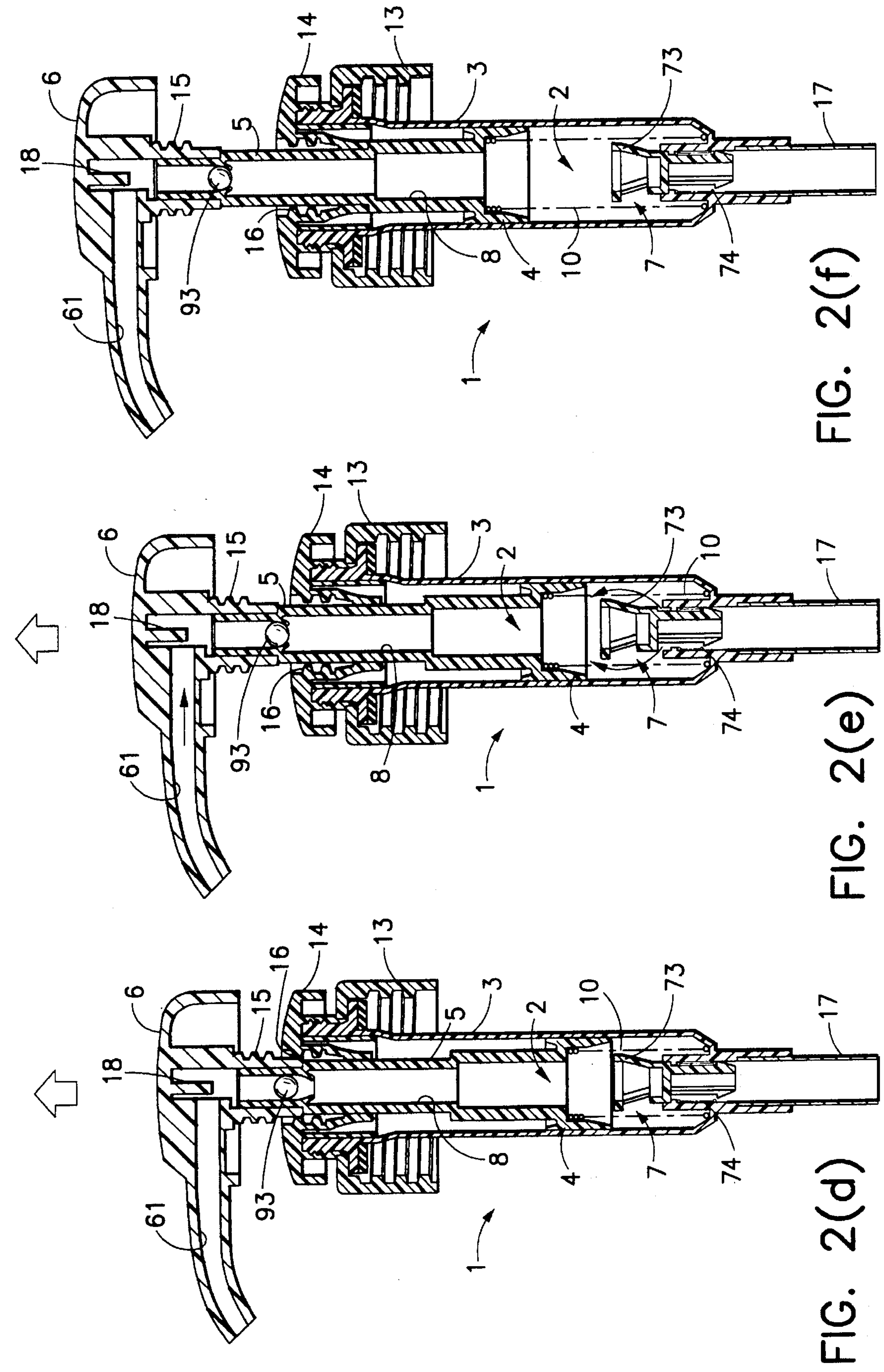

FIGS. 2(*a*)–(*f*) illustrate the operational phases of the present invention. FIGS. 2(*a*) and 2(*f*) depict a pump of the present invention in the starting position. Initially, spring member 10 is in its most expanded state, biasing piston 4 upward into contact with guide ring 14*a* (FIG. 1*a*) of upper cap 14. At this point the volume within pump chamber 2 is at a maximum and pump chamber 2 is filled with fluid.

FIG. 2(*b*) illustrates the pump during the discharge phase. An external force is applied vertically to nozzle 6, compressing first spring member 10 between piston 4 and one end of pump chamber 2. The volume within pump chamber 2 decreases as piston 4 descends into pump chamber 2, creating a positive pressure therein. The positive pressure within pump chamber 2 augments the downward force of second spring member 74 in forcing suction valve head 75 of suction valve body 73 into contact with suction valve seat 72, closing suction valve 7.

The positive pressure within pump chamber 2 forces discharge valve body 93 away from discharge valve seat 92, thereby opening discharge valve 9. The fluid within pump chamber 2 is forced through discharge valve 9 and ultimately out exit passage 61 of nozzle 6. Discharge valve body 93 is forced toward nozzle 6 due to the outward flow of fluid. During this stage, discharge valve stopper 18 in nozzle 6 prevents discharge valve body 93 from entering and blocking exit passage 61 of nozzle 6.

FIG. 2(*c*) illustrates the completion of a full discharge phase. Piston 4 is forced downward within pump chamber 2 until male locking thread 15 of nozzle 6 contacts female locking thread 16 of upper cap 14. At this moment, fluid discharge stops and discharge valve body 93 starts to fall toward discharge valve seat 92 under its own weight.

The length of time for discharge valve body 93 to return to discharge valve seat 92 is a function of fluid viscosity and the diameter and specific gravity of discharge valve body 93. Therefore, the time during which discharge valve body 93 is separated from discharge valve seat 92 is controlled by changing the specific gravity of discharge valve body 93 in accordance with the viscosity of the fluid. For example, a steel discharge valve body 93 produced favorable results with a fluid viscosity of about 200 centipoise. Also, by making discharge valve body 93 out of material with a specific gravity less than the specific gravity of the fluid, such as a resin member as shown in FIG. 1(*c*), discharge valve 9 remains open long enough to provide reliable and complete back-suction.

FIG. 2(*d*) illustrates the back suction phase of operation. The external pressure applied to nozzle 6 is removed, allowing piston 4 to ascend within pump chamber 2 due to the expansion of first spring member 10. As piston 4 moves upward toward the starting position, a negative pressure is created within pump chamber 2.

At this point, the strength of second spring member 74 is greater than the negative pressure existing within pump chamber 2, maintaining suction valve 7 in the closed position. The negative pressure within pump chamber 2 draws the fluid remaining in exit passage 61 of nozzle 6 after the discharge phase back through discharge valve 9 into pump chamber 2. Discharge valve body 93 is drawn downward with the fluid flowing back into pump chamber 2, returning discharge valve body 93 to discharge valve seat 92 to close discharge valve 9. The back-suction of fluid from exit passage 61 of nozzle 6 prevents unwanted dripping and waste of fluid.

Referring now to FIG. 2(*e*), the suction phase starts after discharge valve body 93 returns to discharge valve seat 92 to close discharge valve 9. Discharge valve body 93 remains in contact with discharge valve seat 92 due to its own weight and the negative pressure generated within pump chamber 2. The negative pressure existing within pump chamber 2 overcomes the resilient strength of second spring member 74 to remove suction valve head 75 from suction valve seat 72. The negative pressure within pump chamber 2 then draws fluid from main fluid container 19 (not shown) into pump chamber 2 through suction opening 71.

Figure 3:
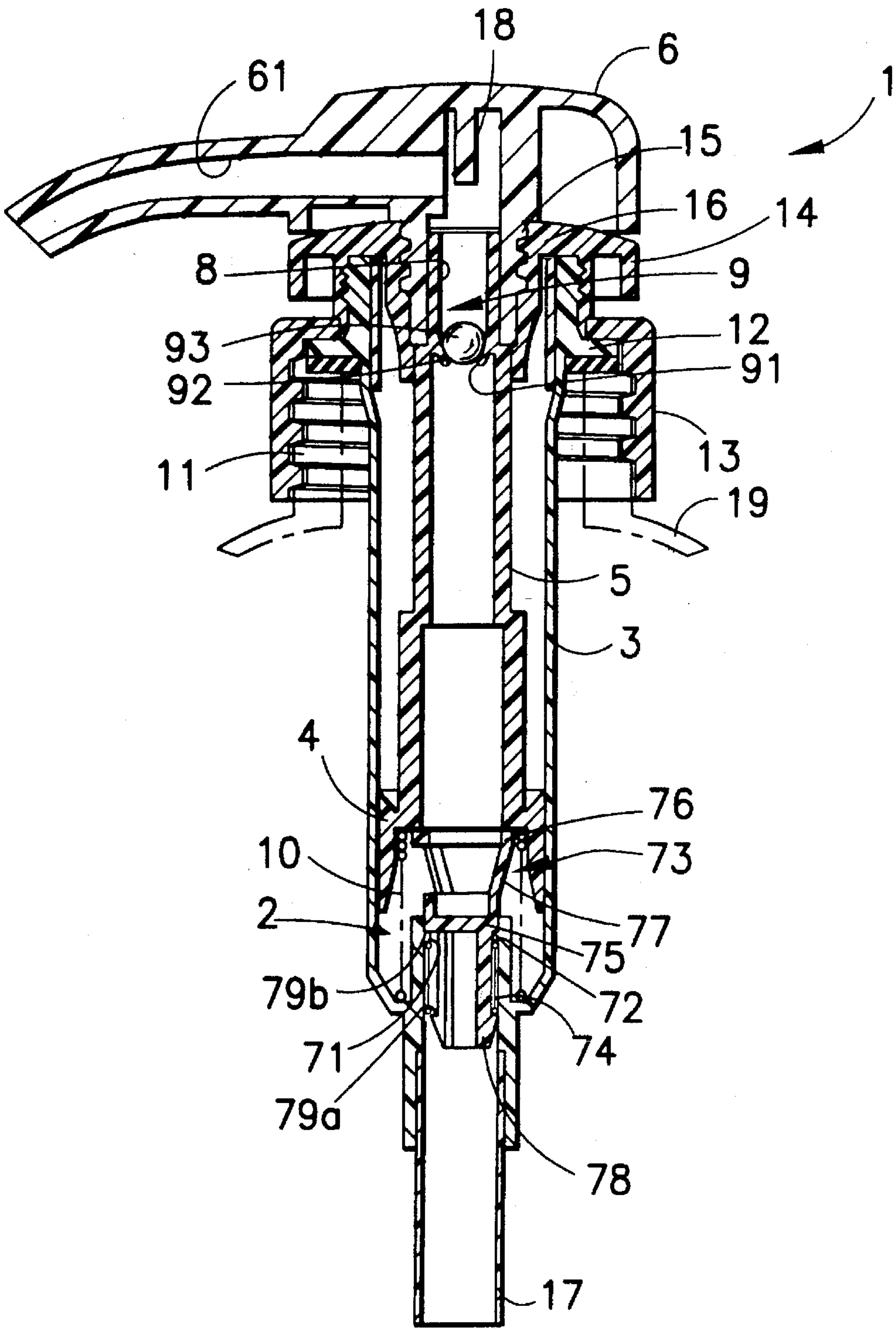
FIG. 3 is a vertical cross-section view of a pump of the present invention.

FIG. 3 illustrates pump 1 in the locked position. An external force is applied vertically to nozzle 6 to bring male locking thread 15 of nozzle 6 into contact with female locking thread 16 of upper cap 14. Male locking thread 15 is then screwed into female locking thread 16 to bring piston 4 into contact with suction valve stopper 76. Suction valve head 75 is thereby brought firmly into contact with suction valve seat 72, securely closing suction valve 7 for sealing during shipment or travel. Suction valve stopper 76 has resiliency such that in the locked position, piston 4 applies a prescribed amount of pressure to suction valve stopper 76 to further secure the seal of suction valve 7.

Male locking thread 15 and piston 4 are integrally formed with nozzle 6. Piston 4 rotates with the rotation of nozzle 6 as male locking thread 15 is screwed into female locking thread 16. Suction valve stopper 76 contacts piston 4 to seal suction valve body 73 against suction valve seat 72.

The elastic resiliency suction valve head 75 permits resilient urging of suction valve head 75 into contact with suction valve seat 72, thereby reliably sealing suction valve 7. This further prevents fluid from escaping out of fluid container 19 (not shown) during shipment or display on store shelves, which is especially important if temperature increases cause a pressure rise therein.

FIG. 4(*a*) illustrates the assembly process for the present invention. Suction valve body 73 is positioned in suction opening 71 of accumulator 3 with second spring member 74 compressed between lower second spring seat 79*a* and upper second spring seat 79*b*. Accumulator 3 is inserted into main fluid container 19 (not shown). Container cap 13 is screwed onto opening rim 11 of main fluid container 19 (not shown), thereby compressing flange 12 of accumulator 3 therebetween.

Upper cap 14 is placed on stem 5 of piston 4 by removing nozzle 6 and sliding upper cap 14 on stem 5. Nozzle 6 is connected to stem 5, with discharge valve body 93 situated within connecting chamber 8 between nozzle 6 and pump chamber 2.

First spring member 10 is placed in pump chamber 2. Piston 4 is then placed in pump chamber 2, compressing first spring member 10 into pump chamber 2. Upper cap 14 is secured to the portion of accumulator 3 directly superior to flange 12, thus sealing piston 4 in accumulator 3. It is also possible to arrange piston 4 within accumulator 3 prior to securing accumulator 3 to opening rim 11 via container cap 13.

Second spring member 74 is located outside pump chamber 2. Second spring member 74 is compressed between upper second spring seat 79*b* and lower second spring seat 79*a*. Second spring member 74 biases lower second spring seat 79*a* away from suction valve opening 71. Suction valve body 73 is thus brought into contact with suction valve seat 72 to close and seal suction valve 7.

FIGS. 4(*b*) and 4(*c*) illustrate another embodiment of suction valve 7. Second spring member 74' is located within pump chamber 2. A suction valve body 73' has a semi-spherical portion facing a suction valve seat 72' and a suction valve stopper 76' supported by stopper notches 77 extending away from suction valve seat 72'.

Second spring member 74' is compressed between the upper surface of suction valve body 73' and a lip portion 80 of accumulator 3 that extends vertically from suction opening 71 into pump chamber 2. Second spring member 74' forces suction valve body 73' downward toward suction valve seat 72' to close and seal suction valve 7.

In the locked position of this embodiment, piston 4 applies a prescribed amount of pressure onto suction valve stopper 76', to reinforce the seal between suction valve body 73' and suction valve seat 72'. The elastic resiliency of suction valve stopper 76' firmly urges suction valve body 73' against suction valve seat 72', reliably sealing suction valve 7.

The composition of second spring member 74 of suction valve 7 may take on various forms and is not limited to the one noted above. Essentially, second spring member 74 must be resilient enough to maintain suction valve 7 in the closed condition until discharge valve 9 closes at the end of the back-suction phase. After discharge valve 9 closes at the end of the back-suction phase, the negative pressure existing within pump chamber 2 overcomes the resilient strength of second spring member 74 to open suction valve 7, initiating the suction mode.

Figure 5A:
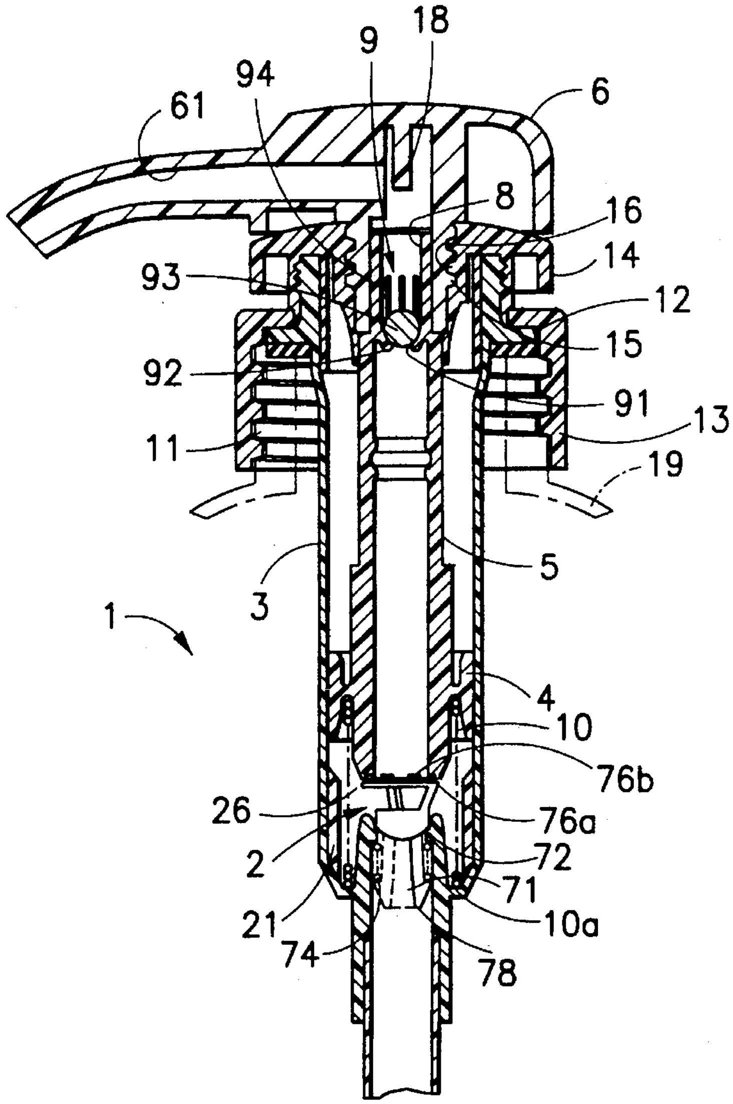
FIG. 5(*a*) is a vertical cross-section view of one embodiment of a pump of the present invention.
Figure 5B:
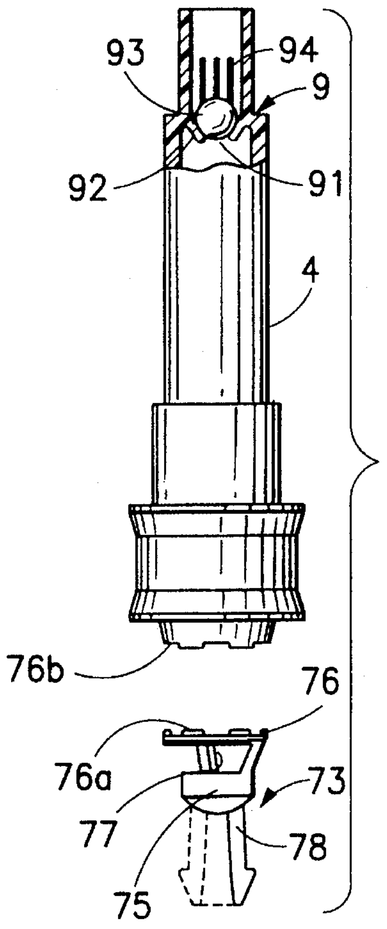
Figure 5C:
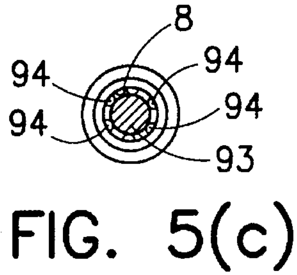
Figure 6:
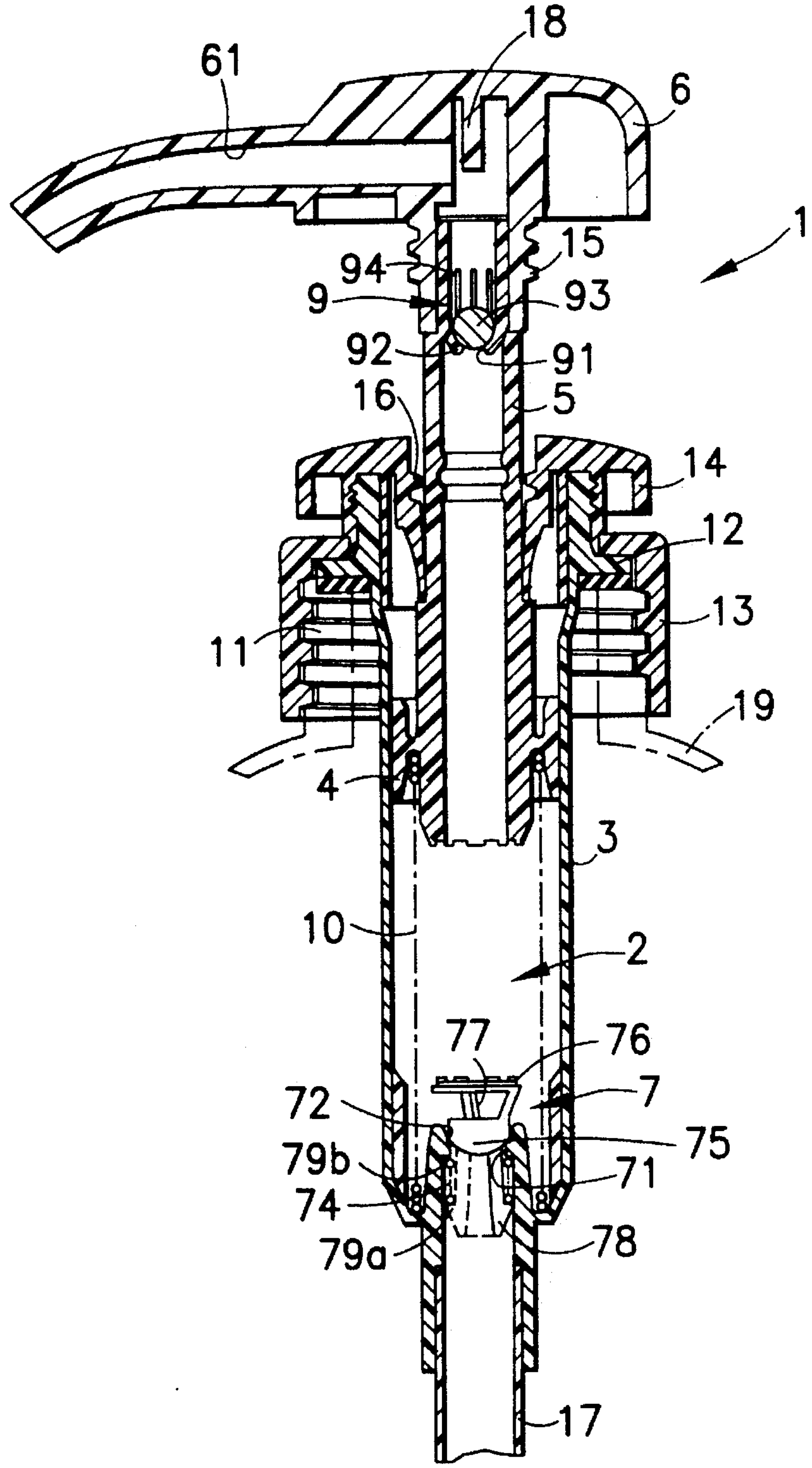
FIG. 6 is a vertical cross-section view of a pump in one embodiment of the present invention.

FIGS. 5(*a*), 5(*b*), 5(*c*) and 6 illustrate another embodiment of the present invention. Referring first to FIGS. 5(*a*) and 5(*b*), a rachet mechanism 26 has a piston rachet 76*b* and stopper rachet 76*a*. Piston rachet 76*b* is located on piston 4 and faces suction valve stopper 76. Stopper rachet 76*a* is located on suction valve stopper 73 and faces piston 4. Stopper ratchet 76*a* and piston ratchet 76*b* include a plurality of teeth arranged on facing surfaces of suction valve stopper 76 and piston 4, respectively. Stopper ratchet 76*a* and piston ratchet 76*b* engage each other when suction valve stopper 76 and piston 4 are brought into contact with each other. As such, suction valve body 73 rotates with nozzle 6 and piston 4.

FIG. 5(*a*) illustrates a pump of the present invention during the locked state. Suction valve body 73 is pressed in contact with suction valve seal 72. If the locked position exists for a long period of time, or if the fluid is highly viscous, the seal between suction valve body 73 and suction valve seat 72 may adhere to each other such that suction valve body 73 cannot reciprocate within suction valve 7 as it should during normal operation. Stopper ratchet 76*a* and piston ratchet 76*b* alleviate this problem by preventing suction valve body 73 from adhering to suction valve seat 72.

Suction valve body 73 rotates with nozzle 6 while male locking thread 15 is unscrewed from female locking thread 16. The rotation of suction valve body 73 thereby breaks the seal between suction valve head 75 and suction valve seat 72 via shearing. This allows suction valve body 73 to reciprocate within suction valve 7 as it should during normal pump operation, as shown by FIGS. 5(*b*) and 6. Suction valve body 73 is reliably released when male locking thread 15 and female locking thread 16 are disengaged, even if the load from locking causes suction valve body 73 to adhere to suction valve seat 72.

Referring now to FIGS. 5(*a*) and 5(*c*), a plurality of vertical discharge ribs 94 are arranged radially within connecting chamber 8. Discharge ribs 94 prevent discharge valve body 93 from sticking to the wall of connecting passage 8 during the discharge phase and back-suction phase. Discharge valve body 93 has a tendency to adhere to the inner wall of connecting chamber 8 when pumping highly viscous fluid, which decreases the efficiency of pump 1. Discharge ribs 94 guide discharge valve body 93 within connecting chamber 8 so that discharge valve body 93 does not contact the inner wall of connecting chamber 8.

The contact area between discharge valve body 93 and discharge ribs 94 is less than the contact area between discharge valve body 93 and the inner wall of connecting chamber 8. The decrease in contact area reduces the drag exerted on discharge valve body 93 as it moves within connecting chamber 8. The present invention is thus capable of pumping highly viscous fluids without discharge valve body 93 adhering to connecting chamber 8. This increases the efficiency of pump 1.

Pump 1 has a first spring member guide 21 which guides first spring member 10 through all phases of pump operation so that first spring member 10 does not impede the reciprocating movement of piston 4 within pump chamber 2. First spring member guide 21 also prevents wear between first spring member 10 and the inner perimeter of pump chamber 2.

First spring member guide 21 consists of a plurality of vertical ribs extending radially on the inner perimeter of pump chamber 2. First spring member guide 21 starts at first spring seat 10*a* and extends upward along the inner perimeter of pump chamber 2 to the approximate point where piston 4 is positioned during the locked state. First spring member guide 21 may also constitute a continuous ridge extending over the entire inner perimeter of pump chamber 2 in the same vertical location as described above.

Referring now to FIGS. 5(*a*) and 6, the upper end of first spring member 10 is held and guided in a ring-shaped gap in the lower end of piston 4, providing further reliability in preventing interference between the outer perimeter of first spring member 10 and the inner perimeter of pump chamber 2.

In the present invention, as described above, second spring member 74 keeps suction valve 7 in a closed state until discharge valve 9 is completely closed following the completion of the discharge and back suction phases. Thus, fluid remaining in nozzle 6 is returned to pump chamber 2, which prevents dripping that occurs in prior art pumps. This conserves the amount of fluid dispensed and eliminates unwanted waste and mess.

Additionally, if the internal pressure of fluid container 19 (not shown) increases due to an increase in temperature, second spring member 74 maintains suction valve 7 in a closed state, thereby preventing fluid from flowing from main fluid container 19 (not shown) into pump chamber 2. This eliminates undesirable dripping and unwanted mess.

Furthermore, if suction valve body 73 of suction valve 7 is made out of a hollow resin member, suction valve body 73 can respond sensitively to changes in pressure to operate accurately and reliably. The resiliency of suction valve body 73 is also increased due to the resin composition, thereby improving the seal between suction valve head 75 and suction valve seat 72.

Through the use of piston rachet **76*b* and stopper rachet 76*a* of rachet mechanism 26 it is possible to break the seal between suction valve seat 72 and suction valve head 75 when the pump is unlocked by rotating suction valve body 73. This action releases suction valve body 73 and provides smooth and unencumbered operation of suction valve 7**.

Adding discharge ribs 94 on the inner wall of connecting chamber 8 maintains a gap between discharge valve body 93 and the inner wall of connecting chamber 8, preventing discharge valve body 93 from sticking, lodging, or in any way adhering to the inner wall of connecting chamber 8 when a high viscosity fluid is used. This provides smooth and uninhibited operation of discharge valve 9.

When first spring member 10 comprises a coil spring, first spring guides 21 can be arranged on the inner perimeter surface of pump chamber 2 to prevent interference between the outer perimeter of first spring member 10 and the inner perimeter of pump chamber 2. This provides smooth operation of first spring member 10 within pump chamber 2 with minimal interference.

Having described the preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A pump comprising:

a pump chamber having an upper end and a lower end;

means for altering the pressure in said pump chamber;

a first check valve having means for permitting a return flow of fluid before closing fully;

a second check valve having means for remaining closed until a specified threshold negative pressure exists in said pump chamber;

said first check valve being connected to said second check valve by said pump chamber;

said means for remaining closed of said second check valve includes a valve body, a valve seat, and a means for biasing said valve body against said valve seat:

said valve body includes a valve head, a valve stopper, means for guiding said valve body in a valve opening, and means for strengthening a seal between said valve head and said valve seat in a locked position; and said valve head cooperates with said valve seat to regulate the flow of fluid from a main fluid container to said pump chamber.

2. A pump as claimed in claim 1 and further, wherein:

said valve body is made out of a resin material;

said means for strengthening includes a plurality of stopper notches extending from said valve head toward said valve stopper;

said valve stopper having a larger diameter than said valve head; and said means for altering the pressure in the pump chamber includes a piston wherein said lower end of a piston is forced into contact with said valve stopper during said locked position, thereby compressing said stopper notches between said valve stopper and said valve head to strengthen said seal between said valve head and a valve seat.

3. A pump as claimed in claim 1 and further, wherein:

said means for biasing is compressibly interposed between an inner lip of said valve opening and said means for guiding said valve body in said valve opening; and said means for biasing forces said means for guiding away from said valve seat toward said main fluid container, thereby pulling said valve head into contact with said valve seat.

4. A pump as claimed in claim 1 and further, wherein:

said means for biasing is compressibly interposed between an inner lip of an extension chamber and a surface of said valve head facing said pump chamber;

said extension chamber extending from said valve seat into said pump chamber; and said means for biasing forces said valve head toward said valve seat, thereby pushing said valve head into contact with said valve seat.

5. A pump, comprising:

a pump chamber having an upper end and a lower end:

means for altering the pressure in said pump chamber;

a first check valve having means for permitting a return flow of fluid before closing fully:

a second check valve having means for remaining closed until a specified threshold negative pressure exists in said pump chamber;

said first check valve being connected to said second check valve by said pump chamber:

said means for altering the pressure in said pump chamber includes a piston and a spring member:

said piston is slidably disposed in said pump chamber having an upper end and a lower end;

said spring member is compressibly interposed between said lower end of said piston and said lower end of said pump chamber biasing said piston toward a ready position where the volume in said pump chamber is at a maximum;

said piston and said upper end of said second check valve have a means for disengaging said second check valve from a locked position;

said means for disengaging includes a piston rachet located on said lower end of said piston, and a valve rachet located on said upper end of said second check valve;

said piston rachet including a plurality of projections extending from said lower end of said piston toward said lower end of said pump chamber;

said valve rachet including a plurality of projections extending from said upper end of said second check valve toward said upper end of said pump chamber; and said piston rachet and said valve rachet engaging so that said second check valve rotates corresponding to the rotation or said piston to break a seal between said second check valve and said pump chamber to allow said second check valve to reciprocate freely within said pump chamber.

6. A pump, comprising:

a pump chamber having an upper end and a lower end;

means for altering the pressure in said pump chamber;

a first check valve having means for permitting a return flow of fluid before closing fully;

a second check valve having means for remaining closed until a specified threshold negative pressure exists in said pump chamber;

said first check valve being connected to said second check valve by said pump chamber;

said means for permitting a return flow of fluid includes a valve body, a valve seat, and a means for stopping said valve body;

said valve seat is disposed within a connecting chamber;

said connecting chamber connects said pump chamber to an exit passage of a nozzle;

said connecting chamber has ribs disposed radially therein to prevent said valve body from adhering to said connecting chamber during said travel of said valve body within said connecting chamber; and said ribs being interspersed within said connecting chamber to maintain said valve body at a specified distance from said connecting chamber.

7. A pump for dispensing fluid from a container, said pump comprising:

a pump chamber having a lower end and an upper end:

a nozzle having an exit passage;

a connecting chamber connecting said pump chamber to said exit passage of said nozzle;

a suction valve disposed within the lower end of said pump chamber controlling fluid ingress from said container to said pump chamber;

said suction valve having a valve body, a valve opening and a valve seat;

a piston slidably disposed within said pump chamber having a lower end facing said pump chamber and an upper end fixedly attached to said nozzle;

a first spring member compressibly interposed between said lower end of said piston and said lower end of said pump chamber biasing said piston so as to cause the volume within said pump chamber to be at a maximum;

said piston reducing the volume of said pump chamber in response to an external pressure applied to said nozzle, creating a positive pressure within said pump chamber;

said piston expanding the volume within said pump chamber in response to removal of said external pressure applied to said nozzle, creating a negative pressure within said pump chamber;

said negative pressure having a suction portion and a back-suction portion;

locking means for selectively locking said piston in contact with said valve body of said suction valve;

said valve body of said suction valve having a stopper, a valve head, and a guide piece;

said valve head of said valve body contacting said valve seat of said suction valve during said positive pressure and during operation of said back suction means;

said stopper of said valve body of said suction vale having stopper notches serving to increase the resiliency of said stopper of said valve body of said suction valve;

said guide piece having a first end integrally attached to said suction valve head and a second end extending through said suction valve opening toward said container; and a second spring member compressibly interposed between said suction valve seat and said second end of said guide piece.

8. A pump for dispensing fluid from a container, said pump comprising:

a pump chamber having a lower end and an upper end;

a nozzle having an exit passage;

a connecting chamber connecting said pump chamber to said exit passage of said nozzle;

a suction valve disposed within the lower end of said pump chamber controlling fluid ingress from said container to said pump chamber;

said suction valve having a valve body, a valve opening and a valve seat;

a piston slidably disposed within said pump chamber having a lower end facing said pump chamber and an upper end fixedly attached to said nozzle;

a first spring member compressibly interposed between said lower end of said piston and said lower end of said pump chamber biasing said piston so as to cause the volume within said pump chamber to be at a maximum;

said piston reducing the volume of said pump chamber in response to an external pressure applied to said nozzle, creating a positive pressure within said pump chamber;

said piston expanding the volume within said pump chamber in response to removal of said external pressure applied to said nozzle, creating a negative pressure within said pump chamber;

said negative pressure having, a suction portion and a back-suction portion;

locking means for selectively locking said piston in contact with said valve body of said suction valve;

said valve body of said suction valve having a stopper, a valve head, and a plurality of guide pieces;

said valve head of said valve body contacting said valve seat of said suction valve during said positive pressure and during operation of said back suction means;

said stopper of said valve body of said suction valve having stopper notches serving to increase the resiliency of said stopper of said valve body of said suction valve;

said guide pieces having first ends integrally attached to said suction valve head and second ends extending through said suction valve opening toward said container; and said second spring member compressibly interposed between said suction valve seat and said second ends of said guide pieces.

9. A pump as described in claim 8 and further, wherein:

said stopper of said valve body of said suction valve is integrally attached to said valve head of said valve body of said suction valve and extends away from said valve seat of said valve body of said suction valve in a reverse conical fashion.

* * * * *